UNITED STATES PATENT OFFICE.

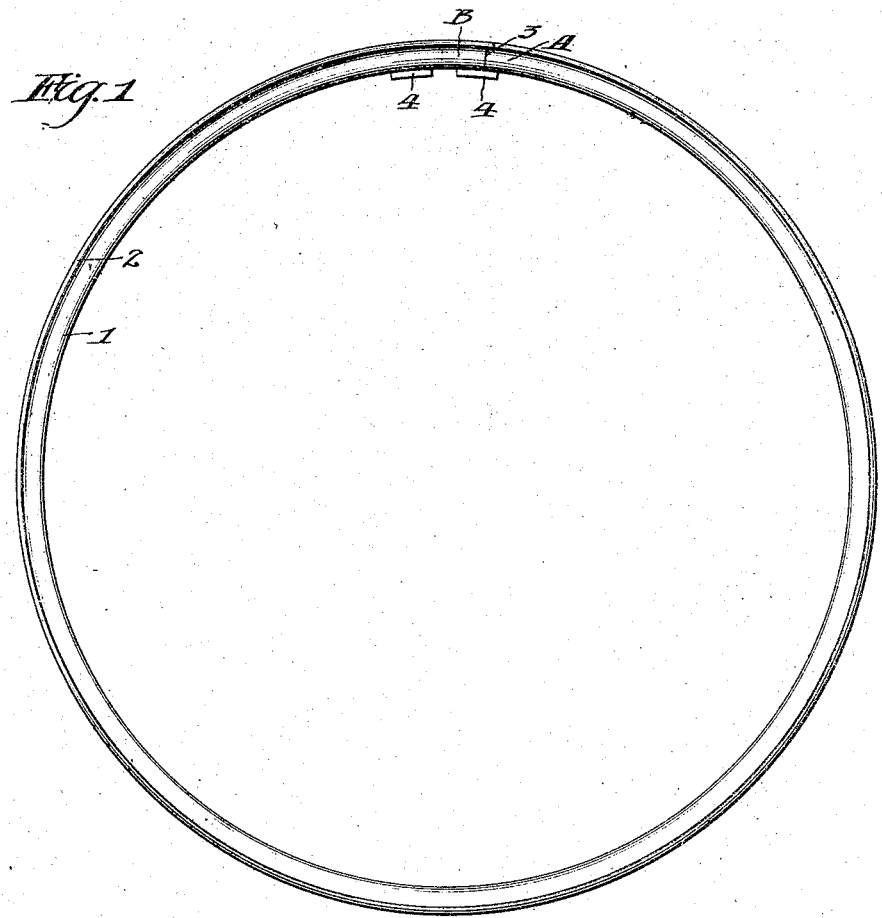
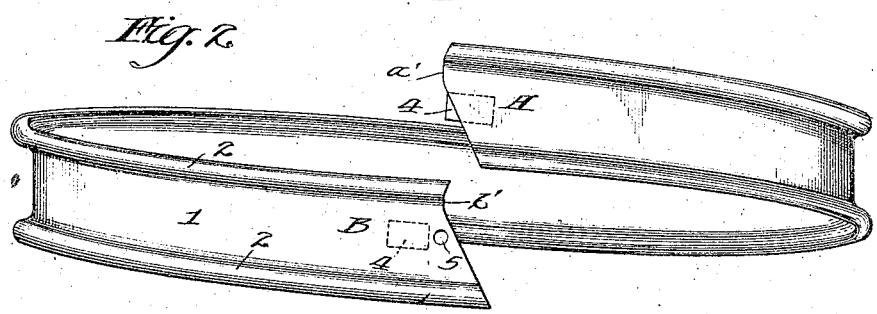

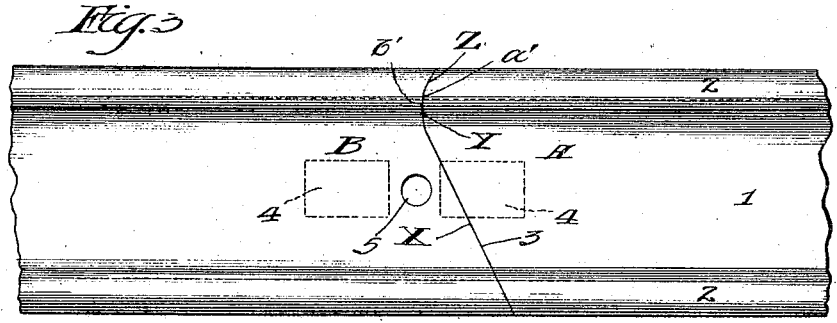
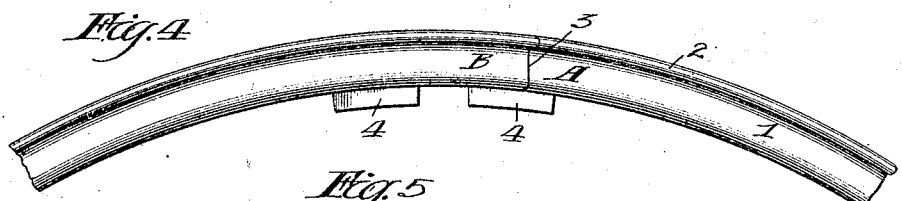
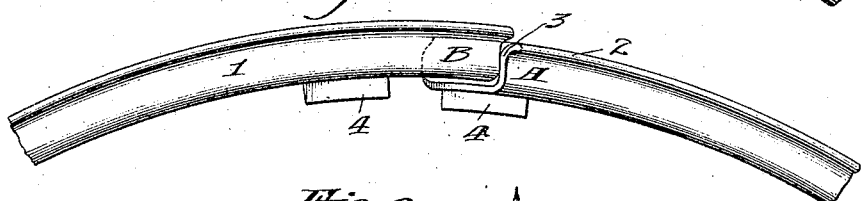
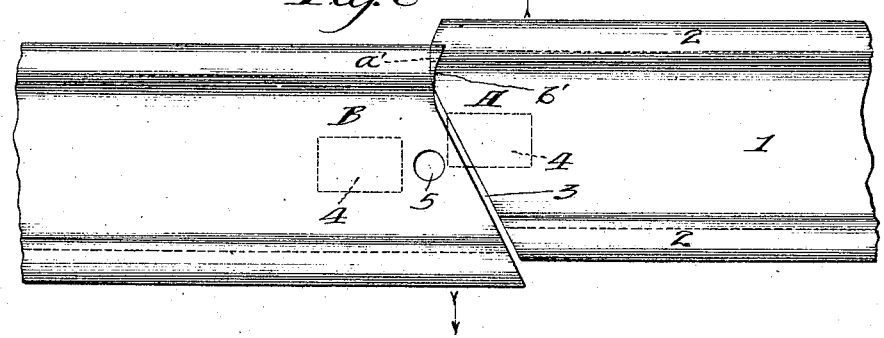
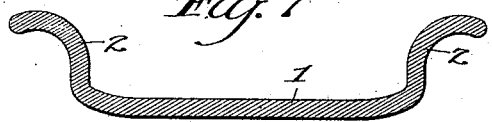
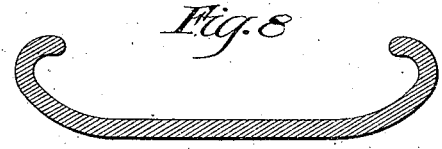

ERLE KING BAKER, OF CHICAGO, ILLINOIS, ASSIGNOR TO UNIVERSAL RIM COMPANY, OF CHICAGO, ILLINOIS, A CORPORATION OF ILLINOIS.

TRANSPLIT DEMOUNTABLE RIM.

1,244,685.  Specification of Letters Patent.  Patented Oct. 30, 1917.

Application filed March 25, 1916. Serial No. 86,598.

*To all whom it may concern:*

Be it known that I, ERLE KING BAKER, a citizen of the United States, and residing at Chicago, Cook county, Illinois, have invented certain new and useful Improvements in Transplit Demountable Rims, of which the following is a specification.

My invention relates to improvements in tire-carrying demountable rims for motor vehicle wheels. The subject matter hereof is a novel transplit rim having rim-ends which are self-alining and self-holding under the pressure of an inflated tire. The invention also comprehends a transplit rim of the self-alining, diagonally split kind, in combination with rim-end connecting lugs which act as driving or anti-creeping studs and one of which interlocks the rim-ends against radial separation.

The invention will be readily understood on reference to the drawings that form part of this specification, in which:—Figure 1 is a side view of an integrally flanged, tire-carrying, demountable rim, embodying my invention;—Fig. 2 is a plan view showing the rim-ends laterally separated, as when the rim is being helically attached to or detached from the base beads of a pneumatic tire;—Fig. 3 is an enlarged plan view of the transplit portion of the rim showing the rim-ends in self-alined abutting condition;—Fig. 4 is a side view of the parts shown in Fig. 3;—Fig. 5 is a like side view, and illustrates the first action of separating the rim-ends and likewise the last part of the operation of placing them in alinement;—Fig. 6 is a plan view, taken from Fig. 5;—and Figs. 7 and 8 together disclose the fact that while the rim is of the integrally flanged transplit type, its cross sectional form may be varied as required to fit it to tires of different cross sections.

Referring to the drawings, 1 represents a demountable rim characterized by integral tire holding flanges, 2, 2. The rim is transversely split at one point only in its circumference. The purpose of splitting the rim in this way is to make its possible readily to place the rim within, and remove it from, the tire (not shown). These operations are described in Letters Patent No. 1,095,778 and No. 1,095,996, and are so well understood by motor car users, that I deem it unnecessary to further describe the same.

The novel form of the transverse split or cut in the rim appears in Figs. 1 to 6 of the drawings, and is fully disclosed in Figs. 2, 3, and 6. It is of the kind which extends from a point on one edge of the rim to a circumferentially advanced point on the other edge thereof. In other words, the split is generally diagonal, whereby the rim ends are made readily separable in transverse directions, as required to permit the rim most easily to be helically applied to and withdrawn from the base beads of the tire. It differs from the forms shown in aforesaid patents to the extent that the cut is not straight from point to point, but is reversely directed for a short distance adjacent one edge, so that one end of the rim is pointed and rests in the resulting gap of the other. The form of the split, and of the resulting rim-ends, here described, is disclosed by the relatively diagonal line, 3, in Fig. 3, which shows the rim ends in alined abutment. With more particularity, the split should be described as a major part extending diagonally from one edge of the rim almost, if not quite, to the opposite flange, plus an intermediate part extending thence in a true transverse direction until said flange is passed, and plus a minor part extending thence in a reverse diagonal direction to the other edge of the rim. The major, intermediate and minor parts or lines of the split are separately indicated by the marks "X," "Y" and "Z," in Fig. 3. This formation provides one end, A, of the rim with a point, $a'$, adjacent one of its flanges, whereas the other end, B, of the rim is provided with a complementary gap, $b'$, near the same flange of the rim. The reverse angle of the split is sufficient to cause the rim ends to engage and to be mutually held in alinement when said ends are passed from the position shown in Fig. 6 to the position shown in Fig. 3.

I prefer that the cut, 3, shall be made by shearing the rim, or by sawing the same, and that in every case the shearing edge, or the saw, shall act in lines which are radii of the rim. Thus formed, the ends do not overlap circumferentially, and hence are more easy of separation.

On the inner periphery of the rim, and on each end, A, B, I provide a rim-end connecting plate or stud, 4. The office of these studs is to coact with the wheel felly (not shown) and positively and non-adjustably, but detachably, connect the rim ends against separation when on the wheel. I take advantage of the presence of these studs, 4, to place one thereof so that it underlaps the end, B, of the rim. The valve stem hole, 5, is formed in the rim-end, B, between the lugs, 4. When the valve stem is secured therein, (following the usual practice), the spreader of the valve stem (not shown) coacts with the underlapping lug, 4, to prevent the accidental separation of the rim ends in a radial direction.

Thus formed, the rim-ends, A and B, become self-alining against the collapsing pressure of the tire thereon and it is not necessary to provide other means for holding the ends in alinement while the rim carries an inflated spare tire. At the same time the now well known merits of the diagonal split are preserved. Slight radial separation of the rim-ends, (in the manner shown in Figs. 5 and 6), frees them, so that they may be fully separated, as shown in Fig. 2.

I call special attention to the fact that when relieved from the restraint of the valve stem and its spreader, the rim ends may be separated radially without first being separated circumferentially. By very slight modification in the point of the convergence of the major and minor diagonal lines, or by changing the inclination of the split, the necessity for circumferential separation of the rim ends may be restored; but I know of no condition in modern practice which makes such separation desirable. Indeed, as tires and rims are now proportioned little, if any, circumferential separation is possible while the rim is in position on the inextensible beads or flanges of a straight side or Q. D. pneumatic tire.

Various modifications of my invention will readily suggest themselves to one who is skilled in the art, and therefore I do not limit or restrict the invention to the precise construction shown and described, except as specifically pointed out in the appended claims.

I claim:—

1. A transplit, integrally flanged, demountable, tire-holding rim having self-alining rim-ends, formed by transplitting the rim upon major and minor generally diagonal lines which converge adjacent one flange of the rim, and at a point distant from the other flange thereof.

2. A transplit, integrally flanged, demountable tire-holding rim having self-alining rim-ends, formed by transplitting the rim upon major and minor generally diagonal lines which merge in a transverse line that extends through one flange of the rim.

3. A transplit, integrally flanged, demountable tire-holding rim having self-alining rim-ends, formed by radially transplitting the rim upon major and minor generally diagonal lines which converge in a portion of the cut in, and perpendicular to, one flange of the rim.

4. A transplit, integrally flanged, demountable tire-holding rim having self-alining rim-ends, formed by transplitting the rim upon major and minor generally diagonal lines which converge adjacent one flange of the rim, a valve stem hole in the rim end which contains the resulting gap, and a stud on the pointed end of the rim and underlapping the gapped rim end.

5. A transplit, integrally flanged, demountable tire-holding rim having self-alining rim-ends, formed by transplitting the rim upon major and minor generally diagonal lines which converge adjacent one flange of the rim, a valve stem hole in the rim end which contains the resulting gap, a stud on the pointed end of the rim and underlapping the gapped rim end, and said gapped end being provided with a like stud, substantially as described.

In testimony whereof, I have hereunto set my hand this 18th day of March, 1916.

ERLE KING BAKER.